(12) United States Patent
Profos

(10) Patent No.: US 9,335,165 B2
(45) Date of Patent: May 10, 2016

(54) SIGHTING DEVICE

(75) Inventor: Markus Profos, Bern (CH)

(73) Assignee: KRISS International SA, Nyon (CH)

( * ) Notice: Subject to any disclaimer, the term of this patent is extended or adjusted under 35 U.S.C. 154(b) by 856 days.

(21) Appl. No.: 13/488,239

(22) Filed: Jun. 4, 2012

(65) Prior Publication Data
US 2013/0097881 A1 Apr. 25, 2013

Related U.S. Application Data

(63) Continuation-in-part of application No. PCT/EP2010/068644, filed on Dec. 1, 2010.

(30) Foreign Application Priority Data

Dec. 2, 2009 (AT) ................................ A 1912/2009

(51) Int. Cl.
| | | |
|---|---|---|
| G01C 3/00 | (2006.01) | |
| F41G 1/32 | (2006.01) | |
| F41G 1/34 | (2006.01) | |
| F41G 1/42 | (2006.01) | |

(52) U.S. Cl.
CPC ...... *G01C 3/00* (2013.01); *F41G 1/345* (2013.01); *F41G 1/32* (2013.01); *F41G 1/34* (2013.01); *F41G 1/42* (2013.01)

(58) Field of Classification Search
CPC ............. G01C 3/00; F41G 1/345; F41G 1/34; F41G 1/32; F41G 1/42
USPC .................. 33/263, 265; 124/87; 362/84, 159
See application file for complete search history.

(56) References Cited

U.S. PATENT DOCUMENTS

| | | | |
|---|---|---|---|
| 2,706,335 A * | 4/1955 | Munsey | 42/145 |
| 3,641,676 A | 2/1972 | Knutsen et al. | |
| 3,678,590 A * | 7/1972 | Hayward | 42/132 |
| 3,942,901 A * | 3/1976 | Ekstrand | 356/251 |
| 4,070,763 A | 1/1978 | Carts, Jr. | |
| 4,136,963 A * | 1/1979 | Budden et al. | 356/251 |
| 4,806,007 A * | 2/1989 | Bindon | 359/424 |
| 4,877,324 A * | 10/1989 | Hauri et al. | 356/251 |
| 6,358,855 B1 * | 3/2002 | Ramachandran et al. | 438/692 |
| 6,385,855 B1 * | 5/2002 | Tymianski | 33/265 |
| 7,562,486 B2 * | 7/2009 | LoRocco | 42/132 |
| 7,721,479 B2 * | 5/2010 | Schulst | 42/111 |
| 8,579,450 B2 * | 11/2013 | Profos | 362/84 |
| 2006/0057954 A1 * | 3/2006 | Hrebeniuk | 454/256 |

(Continued)

FOREIGN PATENT DOCUMENTS

GB        1201779 A        8/1970

OTHER PUBLICATIONS

Light-Emitting Dopants and Fluorescent Dyes, Copyright 2012 Sigma-Aldrich Co. LLC.
Organic Light Emitting Diodes, retrieved from http://depts.washington.edu/cmditr/mediawiki/index.php?title=Fluorescent/phosphorescent_Dopants.

(Continued)

*Primary Examiner* — R. A. Smith
*Assistant Examiner* — Tania Courson
(74) *Attorney, Agent, or Firm* — David J. Kulik; Williams Mullen PC

(57) ABSTRACT

The invention relates to a sighting device containing at least one self-luminous light source and at least one element made of a light-guiding and/or light-collecting material. Preferably, the self-luminous light source is embodied as a tube or ring and this light source is arranged in at least a portion of the length of the tube or ring, or along its entirety, and most preferably uses a tritium gas-containing element.

21 Claims, 17 Drawing Sheets

(56) References Cited

U.S. PATENT DOCUMENTS

2007/0107292 A1* 5/2007 Bar-Yona et al. .............. 42/144
2009/0013581 A1    1/2009 LoRocco
2011/0249428 A1* 10/2011 Profos ........................ 362/159
2013/0188180 A1*  7/2013 Jakob ......................... 356/248
2013/0250551 A1*  9/2013 Schneider ................... 362/97.1

OTHER PUBLICATIONS

International Search Report of International application No. PCT/EP2010/068644 dated Mar. 14, 2011.

Preliminary Examination Report of International application No. PCT/EP2010/068644 dated Mar. 16, 2012.

* cited by examiner

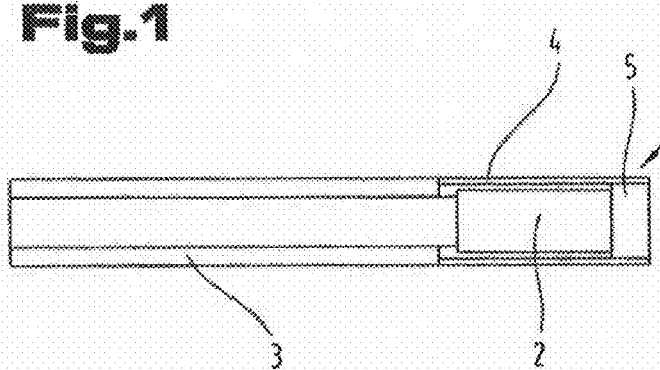
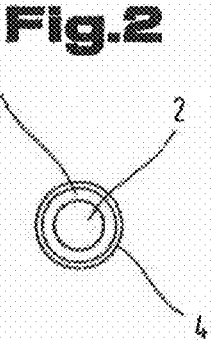
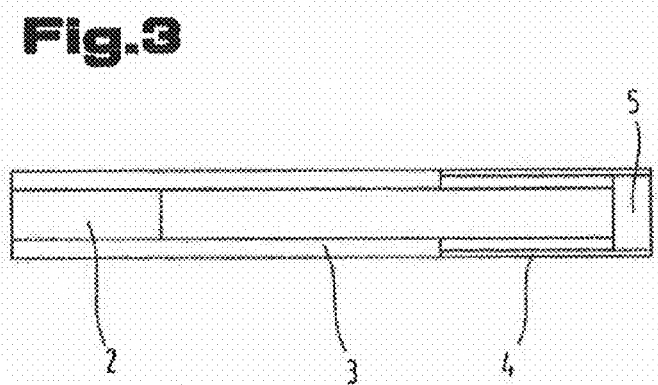
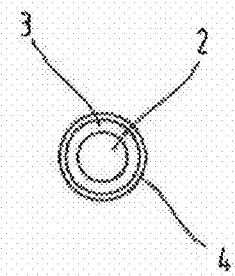
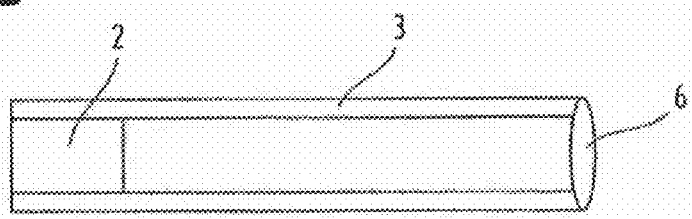

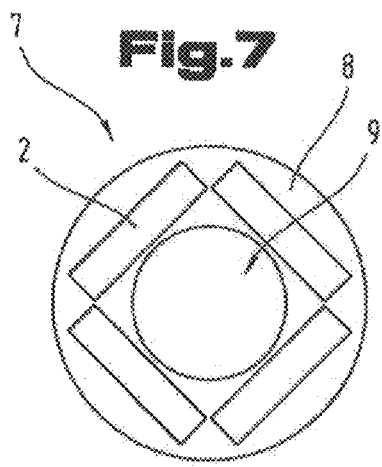
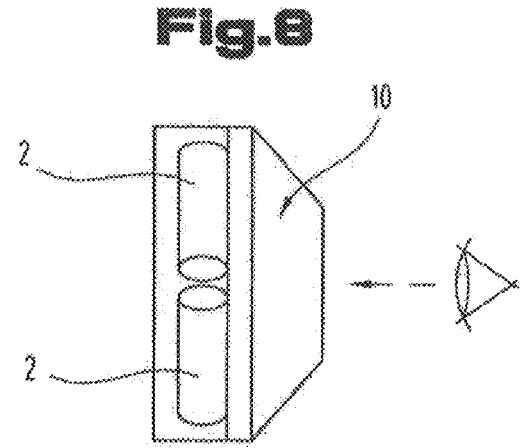
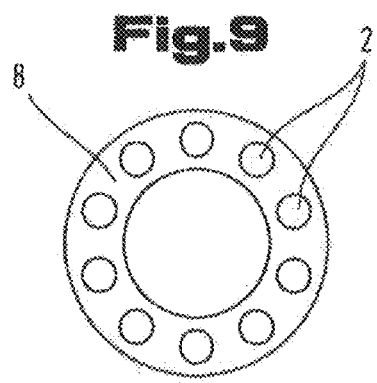
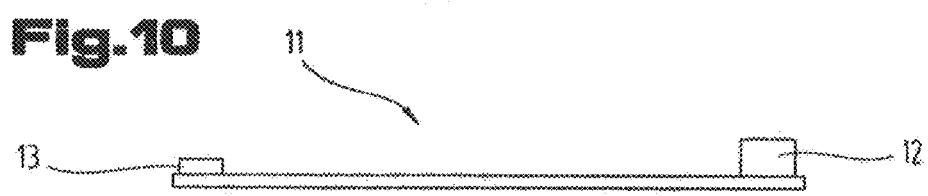
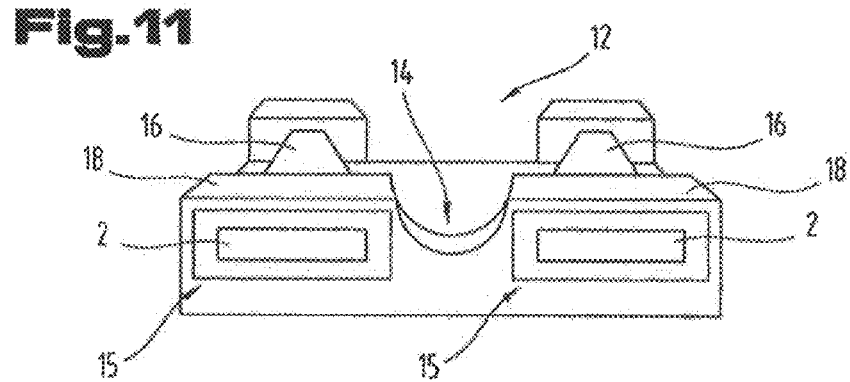

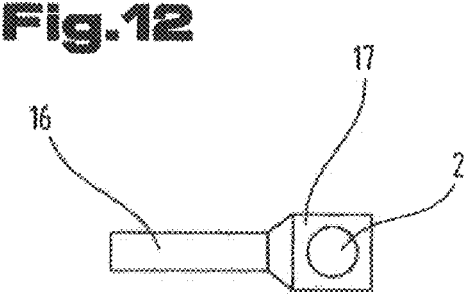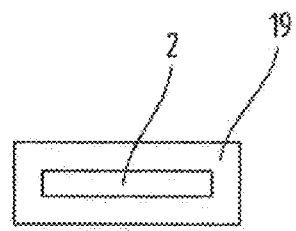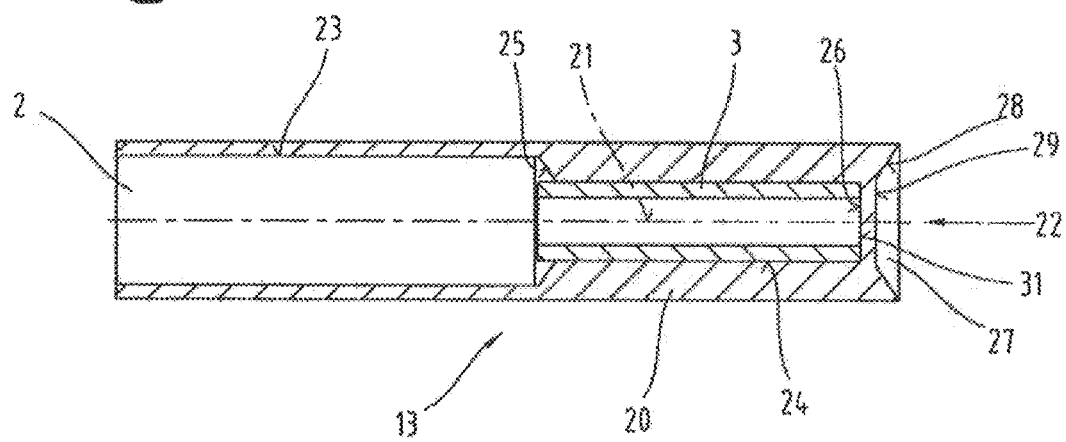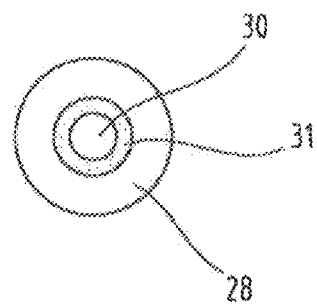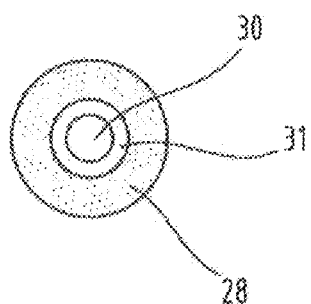

Fig.17
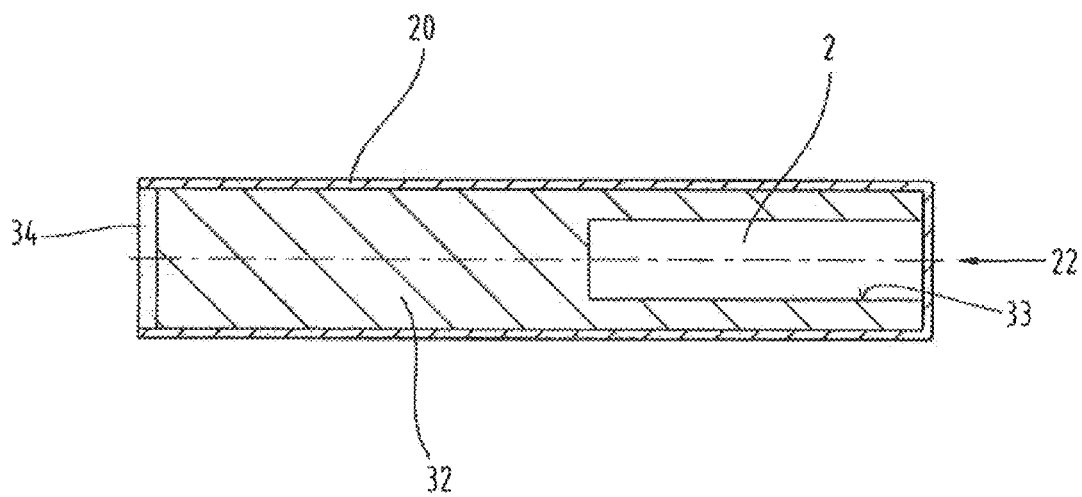
Fig.18                    Fig.19
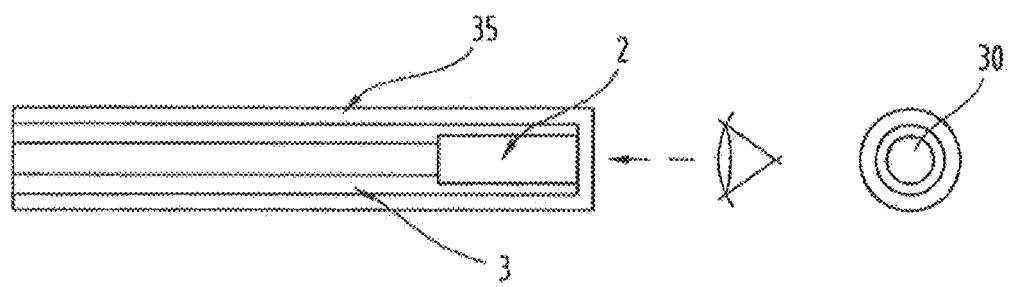
Fig.20                    Fig.21
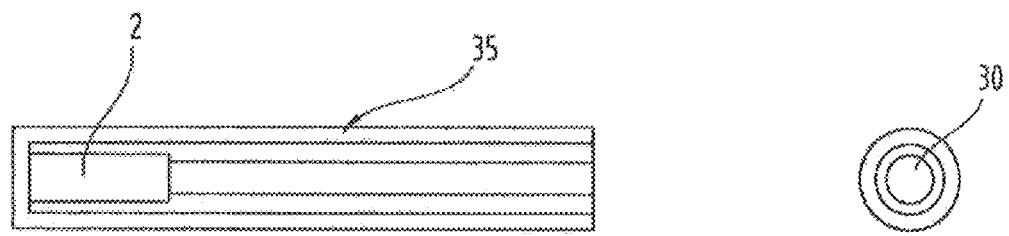

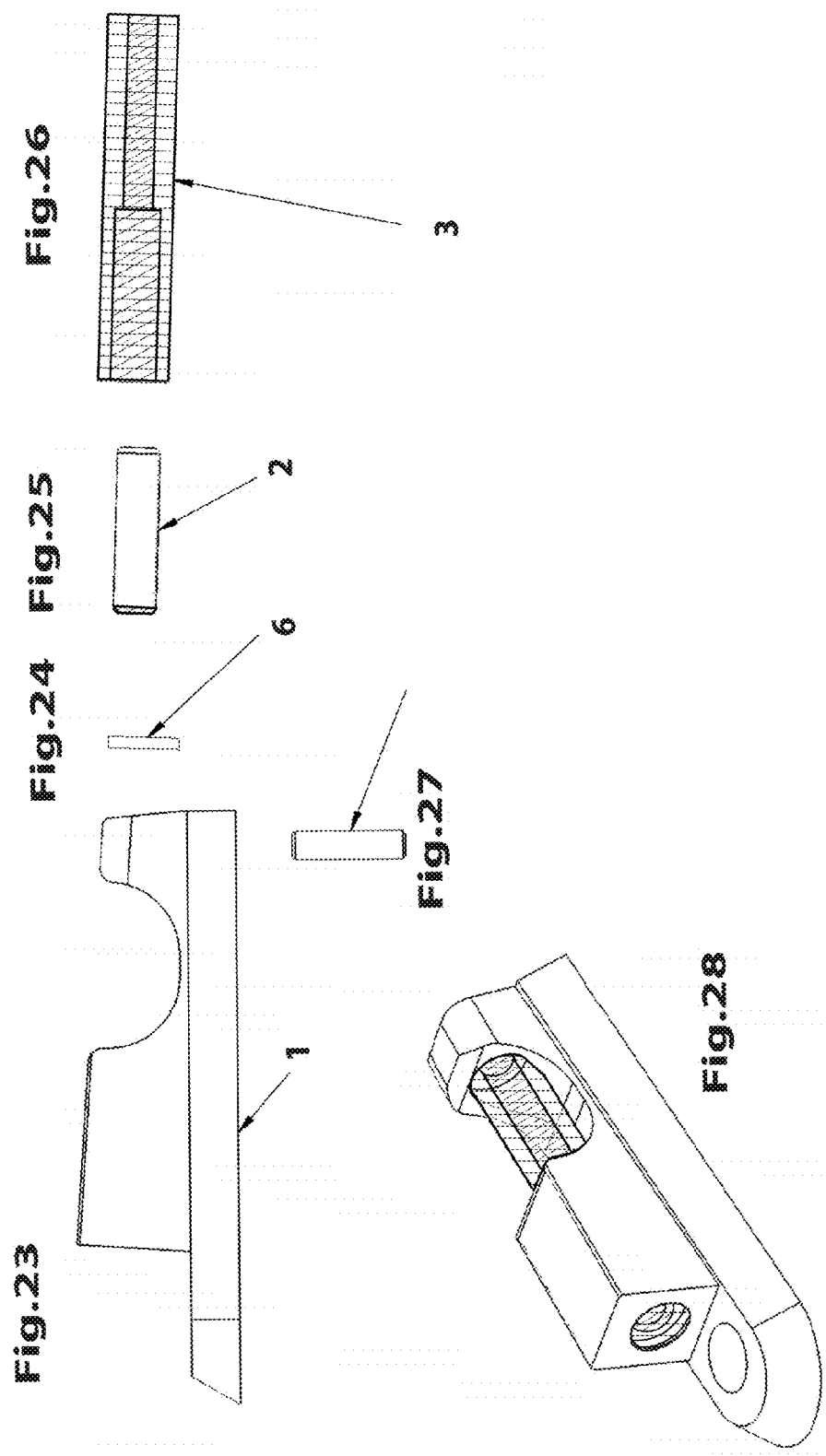

A-A

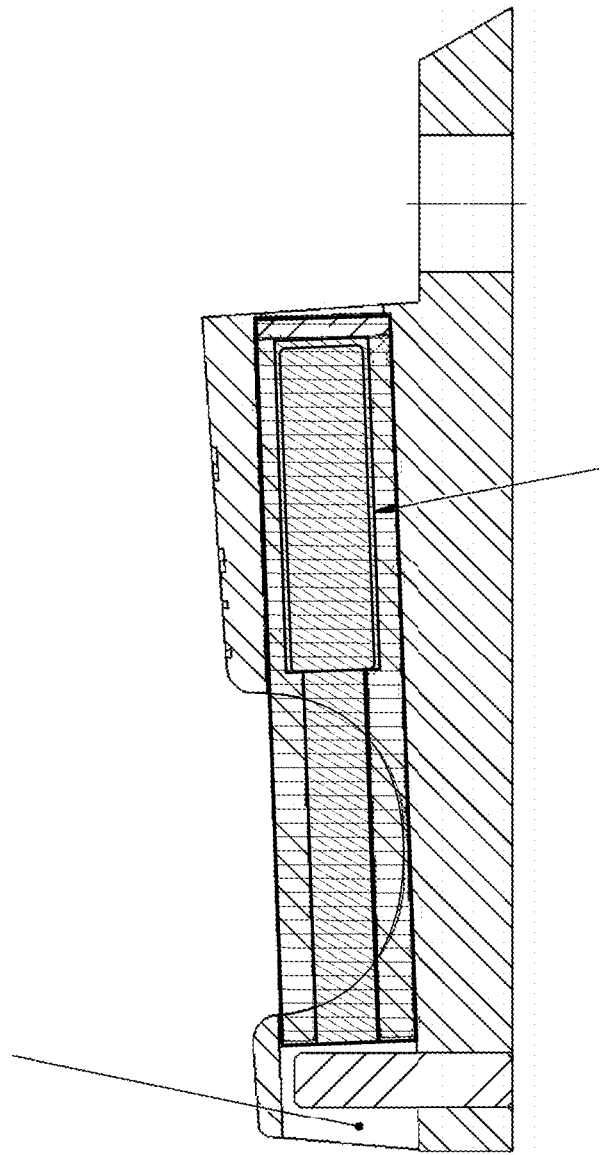
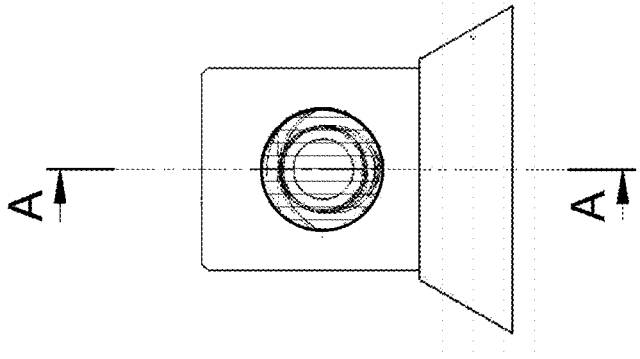

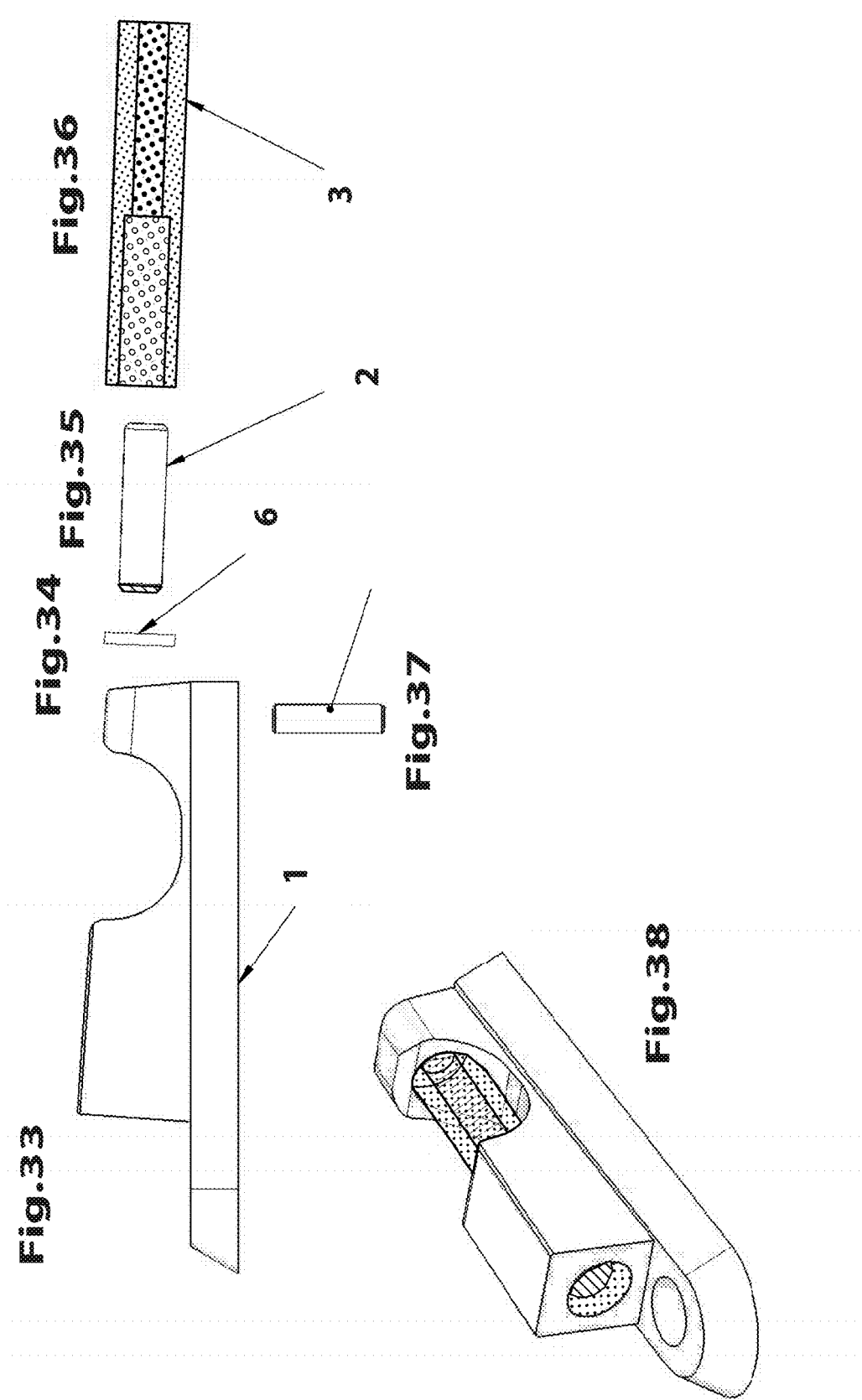

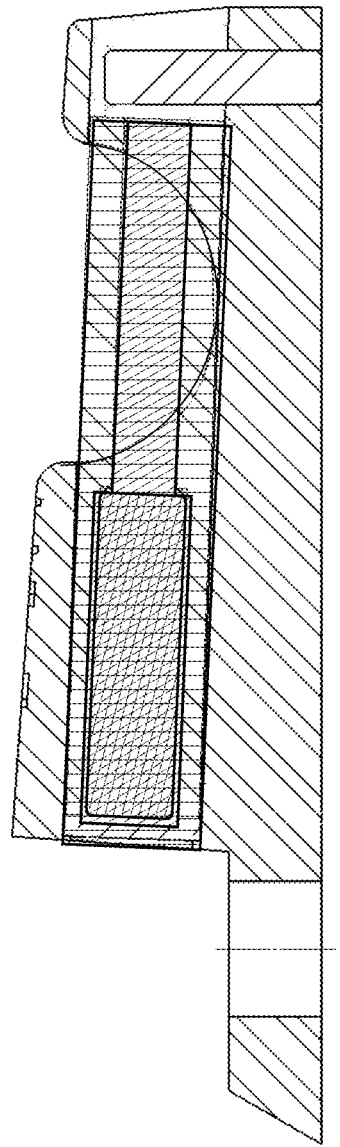
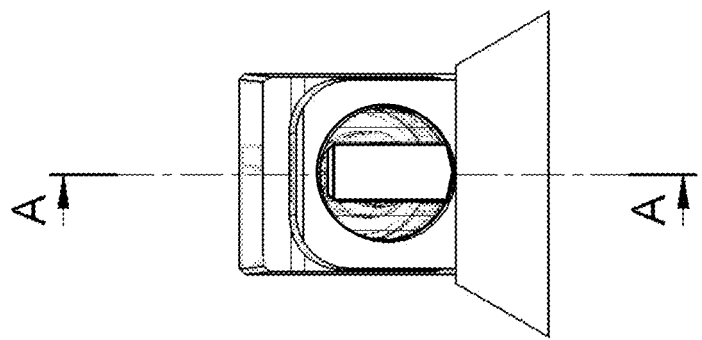

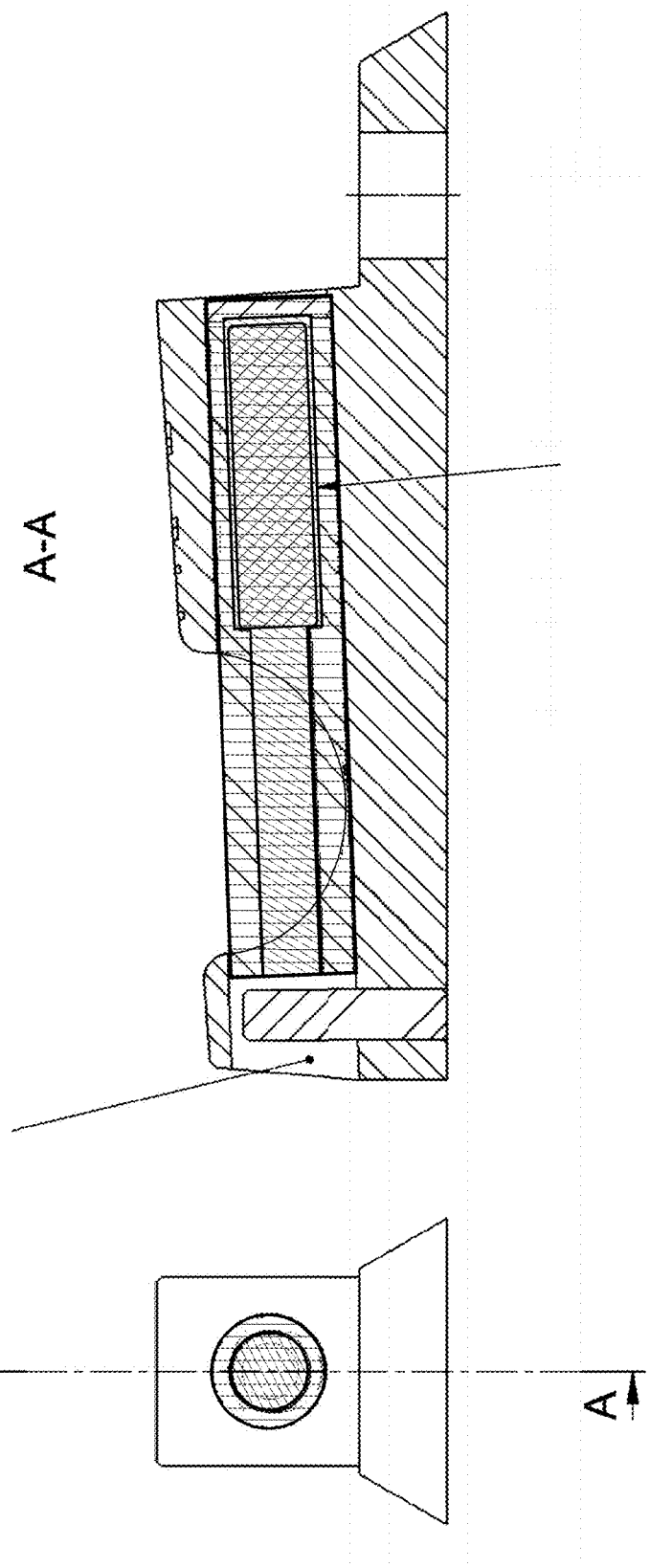

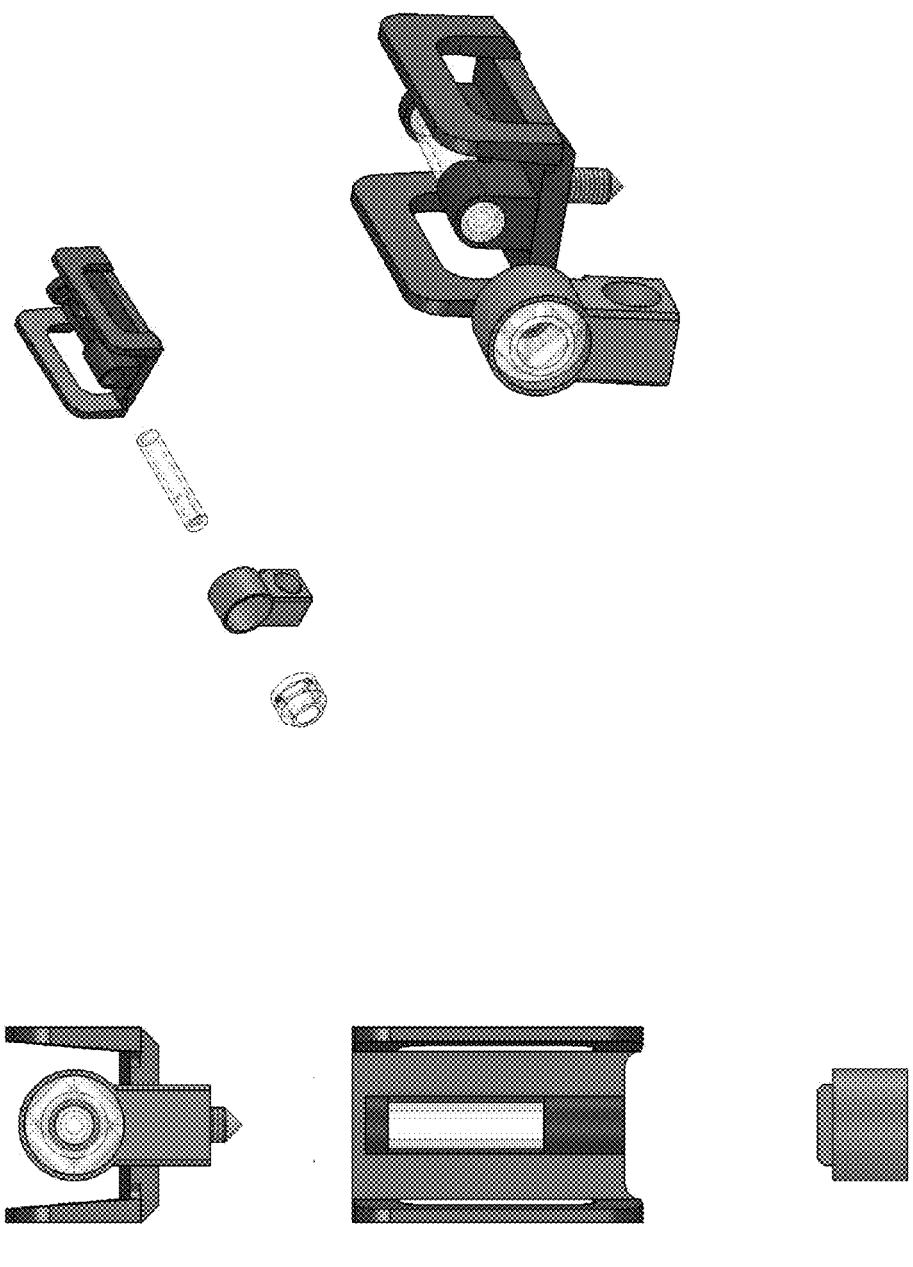

SIGHTING DEVICE

REFERENCE TO RELATED APPLICATIONS

This application is a Continuation-in-Part of PCT/EP2010/068644 filed Dec. 1, 2010 which claims the priority benefit of Austrian Application number A1912/200901748/09, filed Dec. 2, 2009, all of which are incorporated herein by reference.

INTRODUCTION AND RELATED ART

The invention relates to a sighting device containing at least one self-luminous light source and at least one element made of a light-guiding and/or light-collecting material. In one variant, this element is embodied as a tube or ring and the light source or access point(s) being arranged at one or more locations in or portions of the tube or ring.

Optical sighting devices are used in order to align a device connected to the sighting device, by aligning the axis of the sighting device with a viewing axis. Optical sighting devices are used, for example, in measuring instruments, cameras, and in firearms. Sighting devices are also used to align structures or machines.

Optical sighting devices are known in many different embodiments. Sighting devices are known, for example, that are suitable exclusively for use in daylight, for example the sighting apparatus known from U.S. Pat. No. 5,850,700, having a lens, a frame, and two target markings spaced apart from each other. Other sighting devices are conceived for use at twilight or at night, for example by comprising built-in light-emitting means, for example the one known from U.S. Pat. No. 4,070,763, in which a bundle of light-guiding fibers is illuminated with a light source.

Most of the aforementioned sighting devices are poorly suited or in fact entirely unsuitable for use in bright ambient light, since said ambient light exceeds the illuminating power of the built-in light-emitting means, and said light-emitting means thus become ineffective.

The document US2009/0013581 presents a sighting apparatus in the form of a U-notch rear sight and a front sight. In this context, a self-luminous light source is respectively inserted into the front sight and into the free limb of the rear sight. The self-luminous light source is inserted in a tubular light-transmitting housing. In addition, a light guide made of an optical fiber material is arranged in front of the light source in the viewing direction. The material of this light guide is embodied in fluorescing fashion. This arrangement is intended to achieve good visibility of the sighting apparatus both in bright ambient light and in poorer visibility conditions. It is disadvantageous in the context of the known arrangement, however, that the arrangement of the fiber optical system as a light-guiding element results in numerous technical problems that extend from light incoupling to light propagation in the fiber. The known arrangement furthermore has the disadvantage that in dim ambient light, only a poor light yield from the light source is achieved, since considerable intensity losses occur as a result of the fiber optical system located between the observer and light source, and a direct view of the light source is prevented by the fiber optical system.

The document U.S. Pat. No. 3,641,676 relates to a sighting apparatus having a self-luminous light source. The self-luminous light source is of elongated configuration and is constituted by a vial and a radioactive substance present therein.

GB 1,201,779 has as its subject matter a sighting apparatus in which a hollow element, curved into a torus and filled with a radioactive gas, is inserted as a luminous source into an annular groove of a tubular element. The tubular element is moreover surrounded by an opaque jacket.

U.S. Pat. No. 6,358,855 presents a sighting apparatus of the kind recited initially, the light-guiding element being embodied as a fiber-optic component. The use of a fiber optical system entails numerous technical problems that extend from light incoupling to achieving a desired light propagation in the fiber.

SUMMARY OF THE INVENTION

The proceeding art exhibits a lack of a suitable sighting device for use in all lighting conditions or under all ambient light. In one object underlying the present invention, a sighting device is presented that is advantageously suitable for use in any lighting conditions, i.e. both in bright daylight and at twilight and at night or in dark rooms. This and other objects are achieved according to the present invention in that the light that penetrates into the tube through the lateral surface is collected and guided to the end surfaces, and such that the material is made up of a substantially transparent material or polymer, such as a polymethacrylate (PMMA), into which are embedded molecules that fluoresce under the action of ambient light.

The apparatus according to the present invention has the advantage that the user who looks into the apparatus in the axial direction sees at least one luminous marking under all lighting conditions. If the ambient light is dim or absent, it is at least the light source that appears as a luminous dot; and in bright ambient light the end face, facing toward the user, of the element radiates collected light. In the transition region between dim and bright ambient light, both the light source and the luminous end face of the element are visible to the user. The solution according to the present invention furthermore has the advantage that the user looking into the sighting device exactly in the direction of the longitudinal axis through the interior of the tube from the end of the tube sees a portion of the light source in the shape of a central luminous dot that corresponds to the open cross section of the tube. The light source is surrounded by an annular surface, the ring corresponding to the end surface of the tube. When the user of the sighting device sees the circular annular surface and the dot as being exactly concentric, his or her eye is looking into the sighting device exactly in the direction of the longitudinal axis. A parallax deviation can therefore also be very effectively corrected by means of the solution according to the present invention.

According to an economical variant of the invention that is very simple to manufacture, the exterior of the tube can be uncovered.

Another variant of the invention provides that the tube comprises, at least in portions, a casing made of a material that is opaque in the visible light region. The dot generated by the light source can in this case be surrounded by two concentric rings, the inner ring corresponding to the end surface of the tube, and the outer ring being constituted by a region of the casing. In dim or absent ambient light the user sees, in the inner ring, light of the light source guided by the lateral surface, and the inner ring appears lighter than the outer. In bright ambient light, the light of the light source guided axially through the tube's lateral surface is outshone by the ambient light. The inner ring therefore appears brighter, since the end surface of the tube radiates parts of the ambient light that are received by the tube through its lateral surface. The user therefore always sees, in all lighting conditions and when the sighting device is correctly aligned, a central luminous dot and a luminous ring concentrically surrounding the dot.

According to an advantageous variant of the invention, which is notable chiefly for great robustness and simple manufacture, the casing is constituted from a tubular metal sleeve.

Advantageously, the tube or the ring is constituted from plastic or a polymer material or composition. This allows not only great robustness and insensitivity with regard to external influences to be realized, but also good light-guiding properties. Furthermore, the plastic or polymer material is substantially transparent, transmitting on the order of 90 to 95% of ambient visible light in preferred embodiments. The preferred polymer is PMMA, however other light-transmitting material or polymer compositions can be selected.

In order to allow prevention of damage to the light source, as can occur for example due to scratching of the surface of the light source, on the side facing toward the user, the tube can be closed off, on a portion facing toward a user, with a transparent material.

Usefully, the transparent material is inserted into an end region of the metal sleeve. This allows particularly reliable fastening of the transparent material to be achieved in simple fashion.

An advantageous variant of the invention provides that at least one element made of a light-refracting material, in particular a converging lens, is arranged in the tube between the light source and a light exit side facing toward a user. The placement of a light-refracting element makes it possible to achieve, for example, a desired intensity distribution of the emitted light.

Particularly advantageously, the transparent material with which the tube is closed off can be shaped as a lens, in particular a converging lens. A collimation of the light emitted from the light source, and thus an improvement in its visibility, can thereby be achieved.

A variant of the invention provides that the light source radiates light at least radially with respect to its longitudinal extent. In this embodiment of the invention, an elongated light source is preferably utilized. The radiation of light radially with respect to its longitudinal extent allows implementation of a linear illumination or marking on the sighting device, thereby substantially increasing the configuration possibilities.

An advantageous refinement of the variant of the invention recited above provides that the longitudinal extent of the light source is arranged transversely to a sighting direction.

A particularly favorable variant of the invention, which is suitable chiefly for implementing a peep sight, provides that the light sources are embedded in a periphery of the tube or ring. In this context, multiple rod-shaped light sources can be arranged around a center axis of the tube or ring. In accordance with the embodiment of the invention mentioned in this paragraph, the light sources can be arranged in the shape of a polygon, in particular a rectangle, around the center axis. In addition, this and other arrangements or patterns for the light source can be used in any embodiment of the present invention.

A further variant of the invention, which enables very rapid and precise sighting irrespective of ambient lighting conditions, provides that the sighting device comprises a rear sight and a front sight, the front sight comprising an elongated, self-luminous light source that is arranged coaxially with a tube made of a light-guiding or light-collecting material, and the rear sight comprising at least two self-luminous light sources.

A favorable variant provides in this context that the front sight comprises a light source and a tube in accordance with one of Claims 1 to 7. It is thereby possible to ensure not only a simple construction but also excellent visibility and reliability of the sighting device, irrespective of ambient lighting conditions.

Another variant of the invention provides that a housing surrounding at least a part of the lateral surface of the tube of the front sight is present, which housing is made of a transparent material that is different from the material of the tube. In accordance with this variant of the invention, when looking at the front sight the user sees a luminous dot, generated by the light source of the front sight, that is surrounded by two concentric rings; the inner ring corresponds to the end surface of the tube, and the outer ring is constituted by a region of the housing. If the ambient light is dim or absent, what the user sees in the outer ring is light of the light source guided through the housing, and the inner ring appears darker than the outer. In bright ambient light the light of the light source guided axially through the housing is outshone by the ambient light. The inner ring thus appears bright, because the end surface of the tube radiates parts of the ambient light that are received by the tube through its lateral surface. The user therefore always sees, in all lighting conditions and when the sighting device is correctly aligned, a central luminous dot and at least one luminous ring concentrically surrounding the dot.

According to a particularly preferred variant of the invention, the rear sight can be a peep sight and can be embodied in accordance with Claims 9 to 13. This variant of the invention is notable for the fact that the user has the capability for optimum target acquisition by day, and also in diffused light and at night. In good lighting conditions, the rear sight according to the present invention serves as a contrast sight, i.e. upon target acquisition, the front sight is perceived as visible in sharp focus on the unsharp target, while the ring of the peep sight is centered as an unsharp circle around the front sight and the target. In poor lighting conditions, the front sight appears as an illuminated dot that is surrounded by at least one circle, once again yielding a contrast, albeit an illuminated one. The aiming technique remains the same: the front sight is distinguished in sharply visible fashion, as an illuminated dot, from the unsharp target, and the illuminated ring of the rear sight (visible in unsharp fashion) is uniformly centered on the front sight and the target.

In accordance with a further variant of the invention, the rear sight can be embodied as a U-notch sight or V-notch sight, such that at least one light source can be respectively arranged on either side of a U- or V-shaped depression of the rear sight. With this type of embodiment as well, it is possible to achieve optimum visibility of the sighting apparatus irrespective of external lighting conditions, and reliable target acquisition.

The rear sight can furthermore comprise, on both sides of the U- or V-shaped depression, a respective element made of a light-guiding or light-collecting material, which can comprise a light-incoupling region for collecting ambient light.

Optimum illumination of the rear sight can be achieved by the fact that the longitudinal extents of the light sources of the rear sight extend transversely to a sighting direction. This arrangement of the light sources makes it possible for a user to acquire a target very quickly, since the exact position of the depression of the rear sight can be sensed rapidly. According to a variant of the invention, at least one of the light-guiding elements can have a T-shaped cross section, such that the light source can be arranged in a crosspiece of the T.

Alternatively to a T-shaped cross section, at least one of the light-guiding elements can also be of cylindrical configuration, in particular having rectangular base surface.

In order to enable good and stable fastening of the light-guiding elements and the light sources, the rear sight can have, on both sides of its U- or V-shaped depression serving for sighting, at least one respective mount into which is insertable an end-face end region, containing the at least one light source, of the element made of light-guiding material.

BRIEF DESCRIPTION OF THE DRAWINGS

The patent or application was originally filed with at least one drawing executed in color, and all the color drawings have been amended to contain black and white images. The different black and white hatched areas in the drawings correspond to different translucent shades of green in the originally filed color depictions, and the different black and white dotted areas correspond to different shades of translucent red in the original color depictions.

The invention, along with further advantages, will be explained in greater detail below with reference to several non-limiting exemplifying embodiments that are depicted in the drawings, in which:

FIG. 1 is a cross section through a first variant of a sighting device according to the present invention;

FIG. 2 is a front view, facing toward a user, of the variant of FIG. 1;

FIG. 3 is a cross section through a second variant of a sighting device according to the present invention;

FIG. 4 is a front view, facing toward a user, of the variant of FIG. 3;

FIG. 5 is a cross section through a third variant of the invention;

FIG. 6 is a cross section through a fourth variant of the invention;

FIG. 7 is a front view of a fifth variant of a sighting device according to the present invention;

FIG. 8 is a side view of the sighting device of FIG. 7;

FIG. 9 is a front view of a sixth variant of the invention;

FIG. 10 shows a sighting device according to the present invention having a rear sight and front sight;

FIG. 11 is a perspective front view of a variant of a rear sight of the sighting device of FIG. 10;

FIG. 12 is a side view of a light-guiding element that can be used in the variant of the invention depicted in FIG. 10;

FIG. 13 is a front view of the light-guiding element of FIG. 11;

FIG. 14 is a longitudinal section through a variant of a front sight of the sighting device of FIG. 13;

FIG. 15 is a view of the variant of the front sight of FIG. 14 in a sighting-in direction, in poor lighting conditions;

FIG. 16 is a view of the variant of the front sight of FIG. 14 in a sighting-in direction, in good lighting conditions;

FIG. 17 is a longitudinal section through a further embodiment of a front sight of the sighting device of FIG. 13;

FIG. 18 is a longitudinal section through a further embodiment of a front sight of the sighting device of FIG. 13;

FIG. 19 is a view of the front sight of FIG. 18 in a sighting-in direction;

FIG. 20 is a longitudinal section through yet another embodiment of a front sight of the sighting device of FIG. 13, and FIG. 21 is a view of the front sight of FIG. 20 in a sighting-in direction.

FIGS. 23-28 depict the component parts of a front sight as shown in FIG. 22 (viewed in horizontal of landscape). The light source 2 is shown separated from the green tube 3 (where multiple shades of green are represented by different hatching patterns) on the far right side, and light-refracting element 6 on its left side, with the front sight structural housing 1 for the front sight tube at the far left side. FIG. 26 fiber tube, here depicted by hatching representing shades of translucent green and in other embodiments dotted areas representing shades of translucent red, can be constructed of materials that will glow or be illuminated only in the daylight to afford sighting in all ambient light conditions. FIG. 28 depicts these elements in operating condition. FIG. 27 is an anchoring post.

FIGS. 30 and 32 show a view of the green tube with the sight frame (depicted as transparent dashed lines), with area for anchoring post at one end.

FIG. 31 shows the image of FIG. 29 without foreground sight.

FIGS. 33-38 depict a similar front sight as in FIGS. 23-28 where doted areas representing different translucent shades of red color instead of green is used to make illuminated sighting elements.

FIGS. 39-42 also show view similar to those in FIGS. 29-32.

FIG. 48 (sheet 17/17) depicts the design of an exemplary front and rear sight combination, with an exploded view of components in the center and the view down the sight at the bottom or left.

DETAILED DESCRIPTION OF EXEMPLARY EMBODIMENTS

Figure 22:
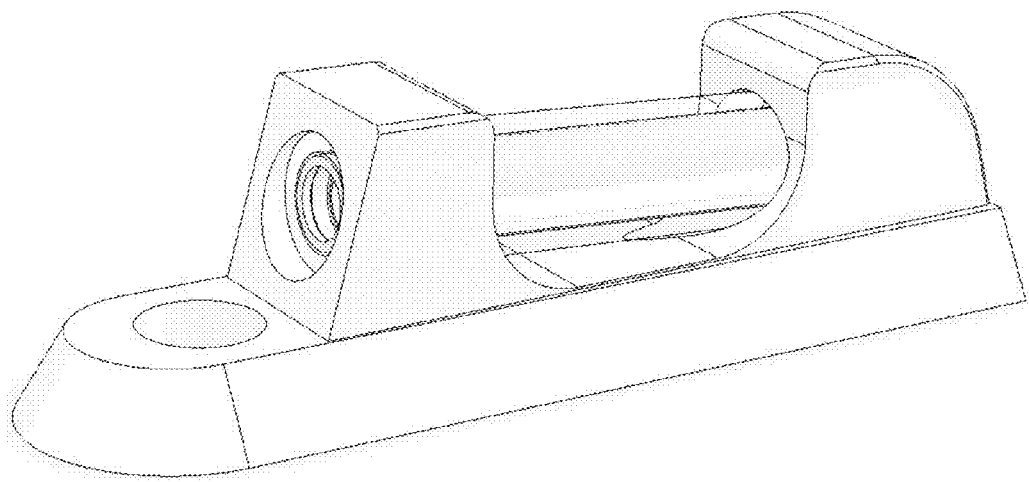
FIG. 22 is a side view of an exemplary front sight design.
Figure 30:
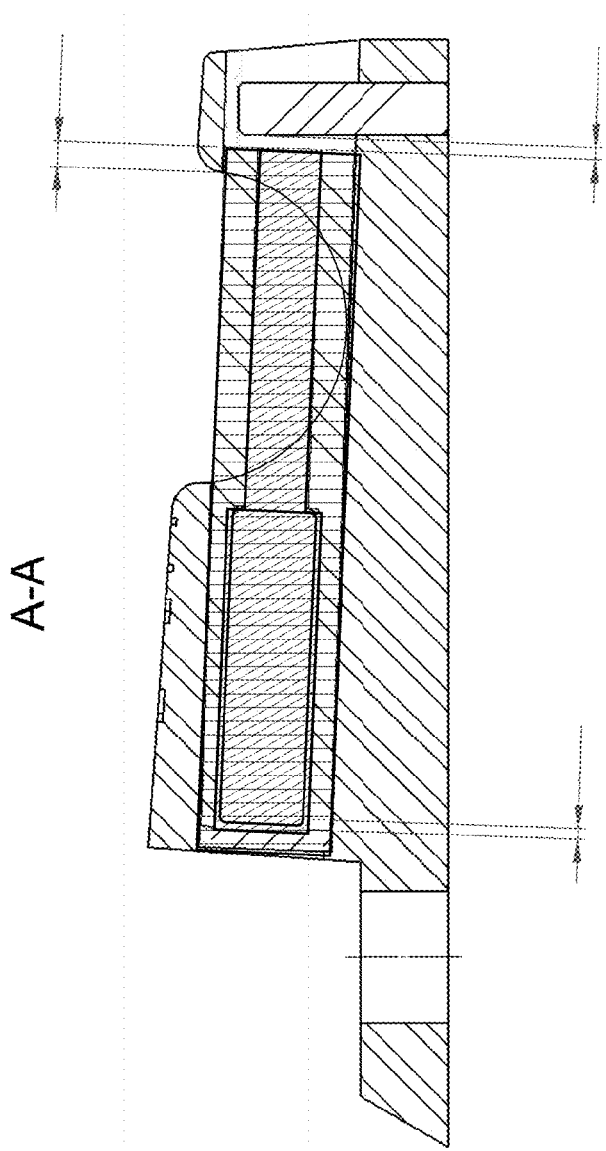
Figure 29:
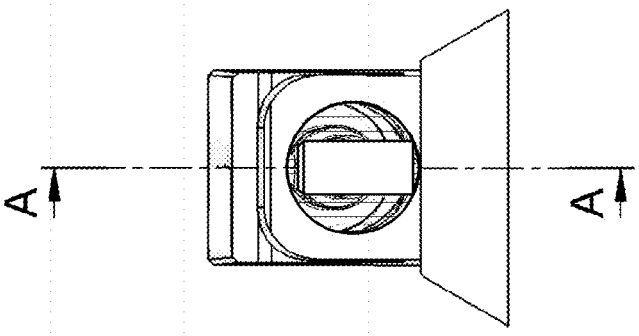
FIG. 29 Depict the operator's view down the sight of FIG. 28, with sight visible in foreground.
Figure 43:
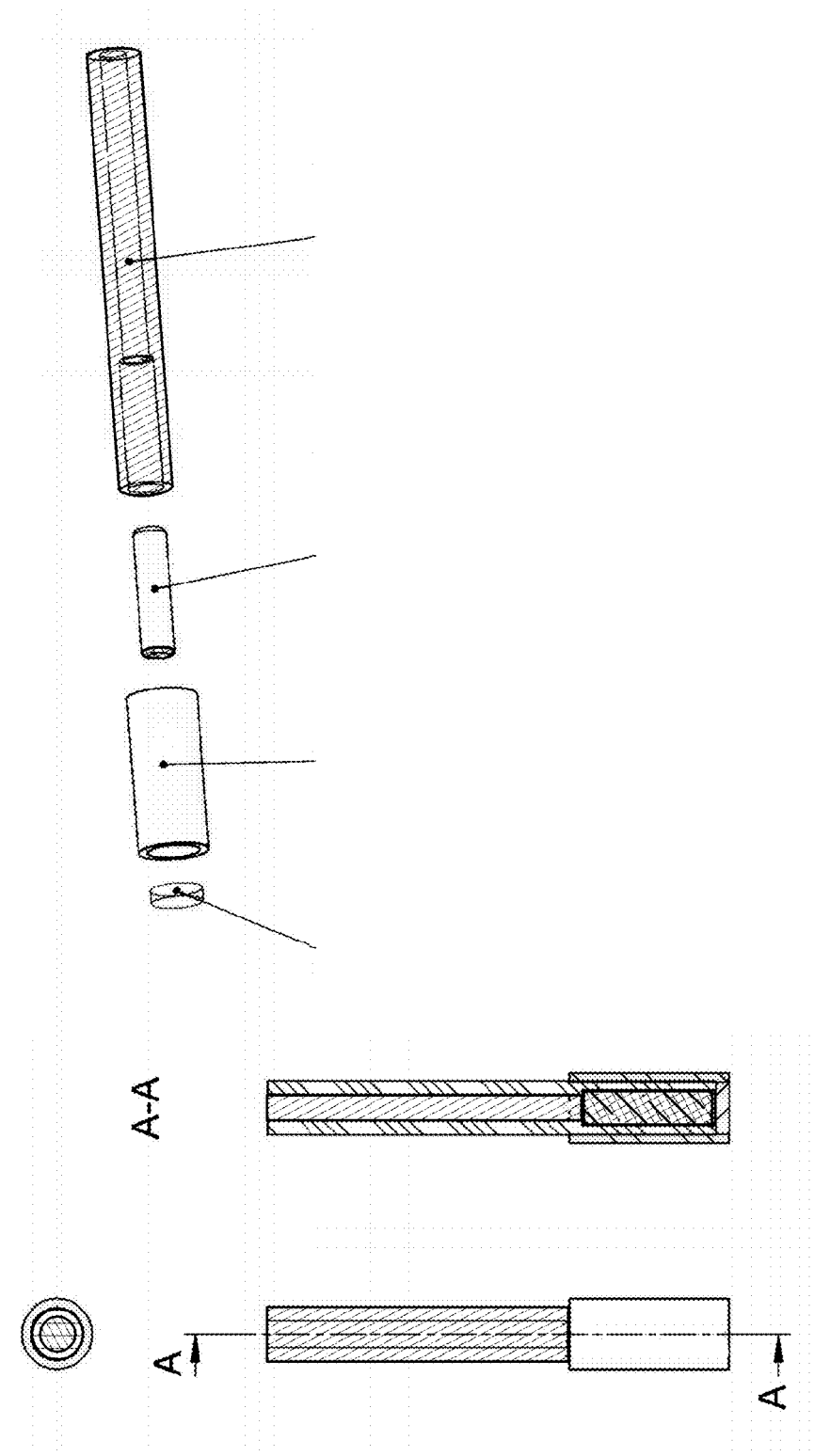
FIG. 43 (sheet 12/17) depicts an exploded view of the tube with all of the functional elements as shown in FIG. 1, for example.
Figure 44:
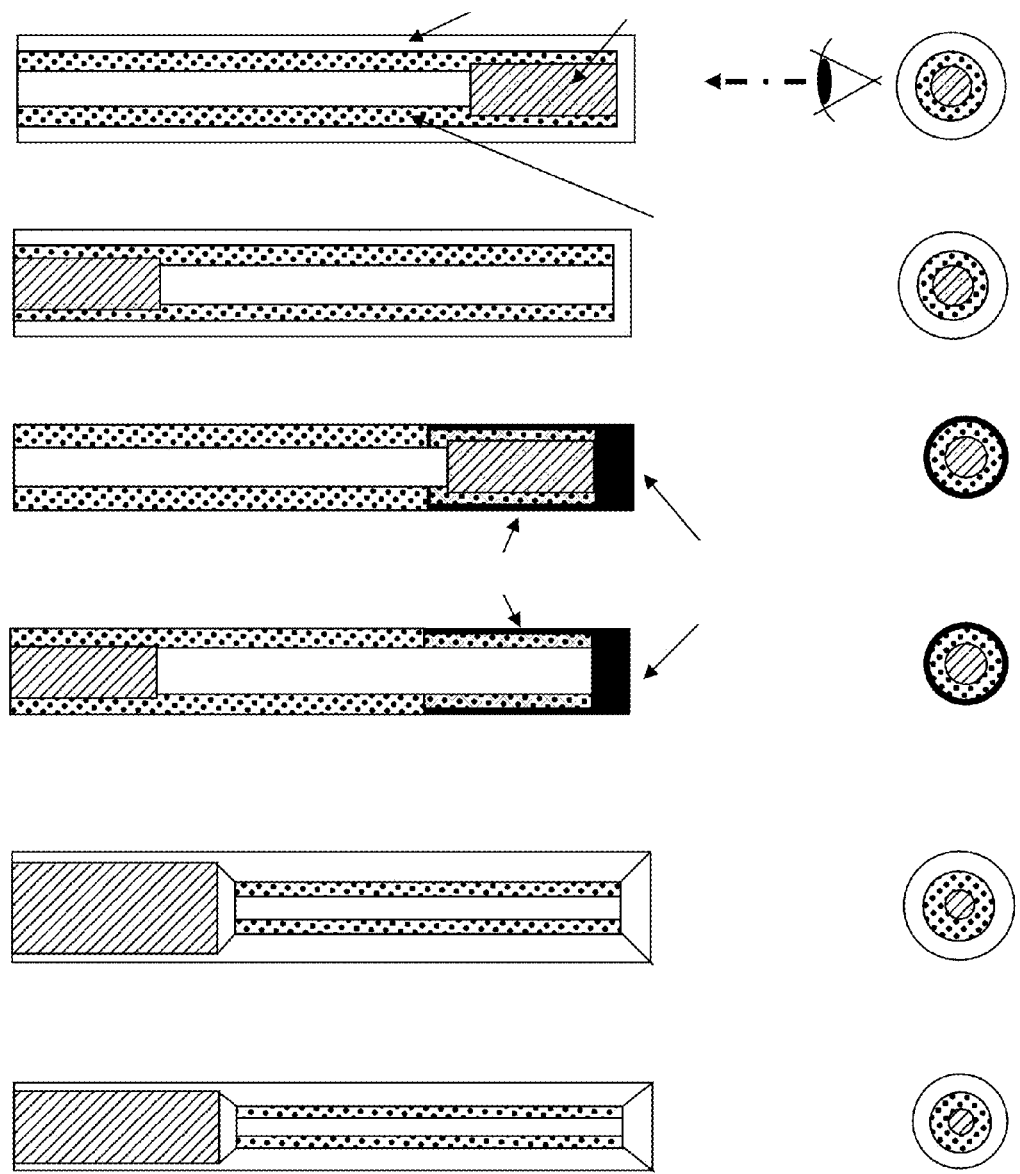
FIG. 44 (sheet 13/17) depicts various design and color options on the left side (where dotted areas are red, hatched areas are green, and solid black is blue), and the resulting target sighting images on the right side (where solid black is a dark outline, dotted areas are red, and hatched areas are green). Various combinations of rings, colors, illuminated and non-illuminated images can be selected.
Figure 45:
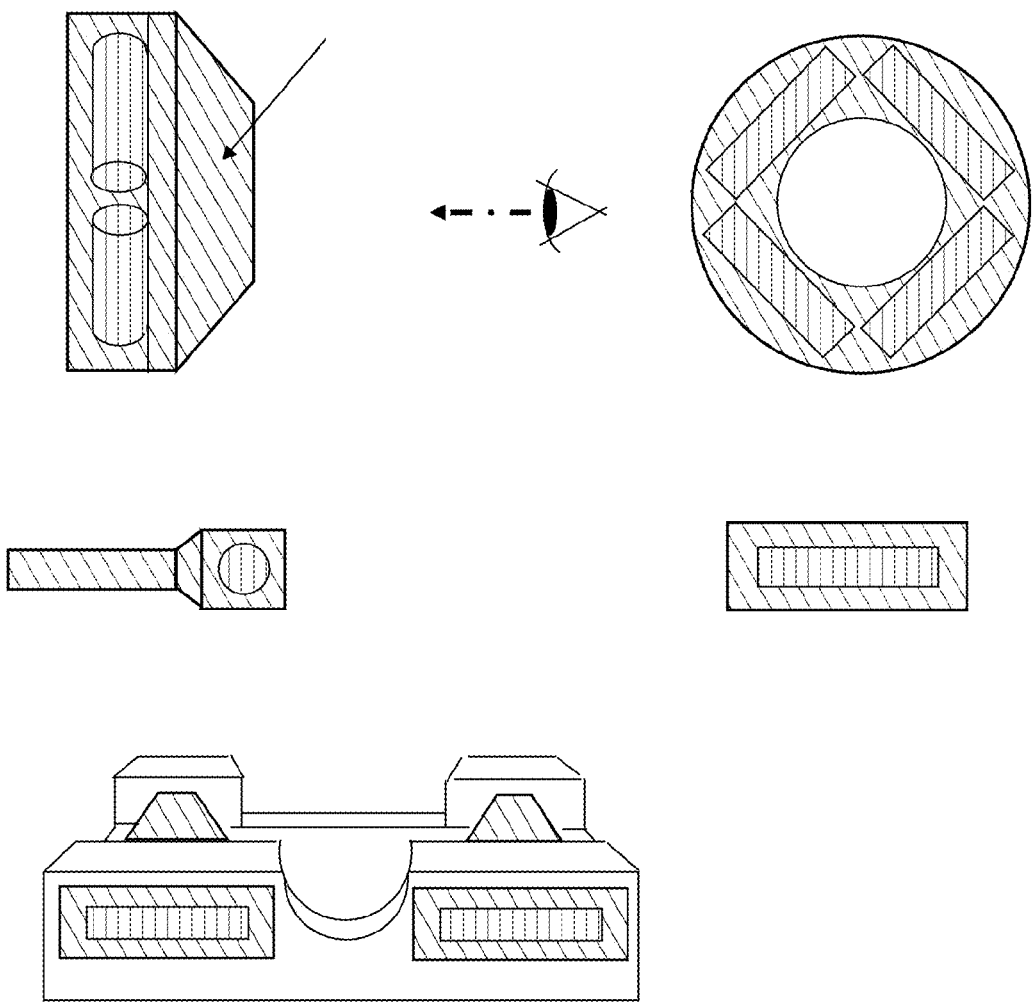
FIG. 45-46 (sheets 14-15/17) depict some of the various geometrical designs that can be used for the target sighting images and compared to the FIGS. 7-11 above.
Figure 46:
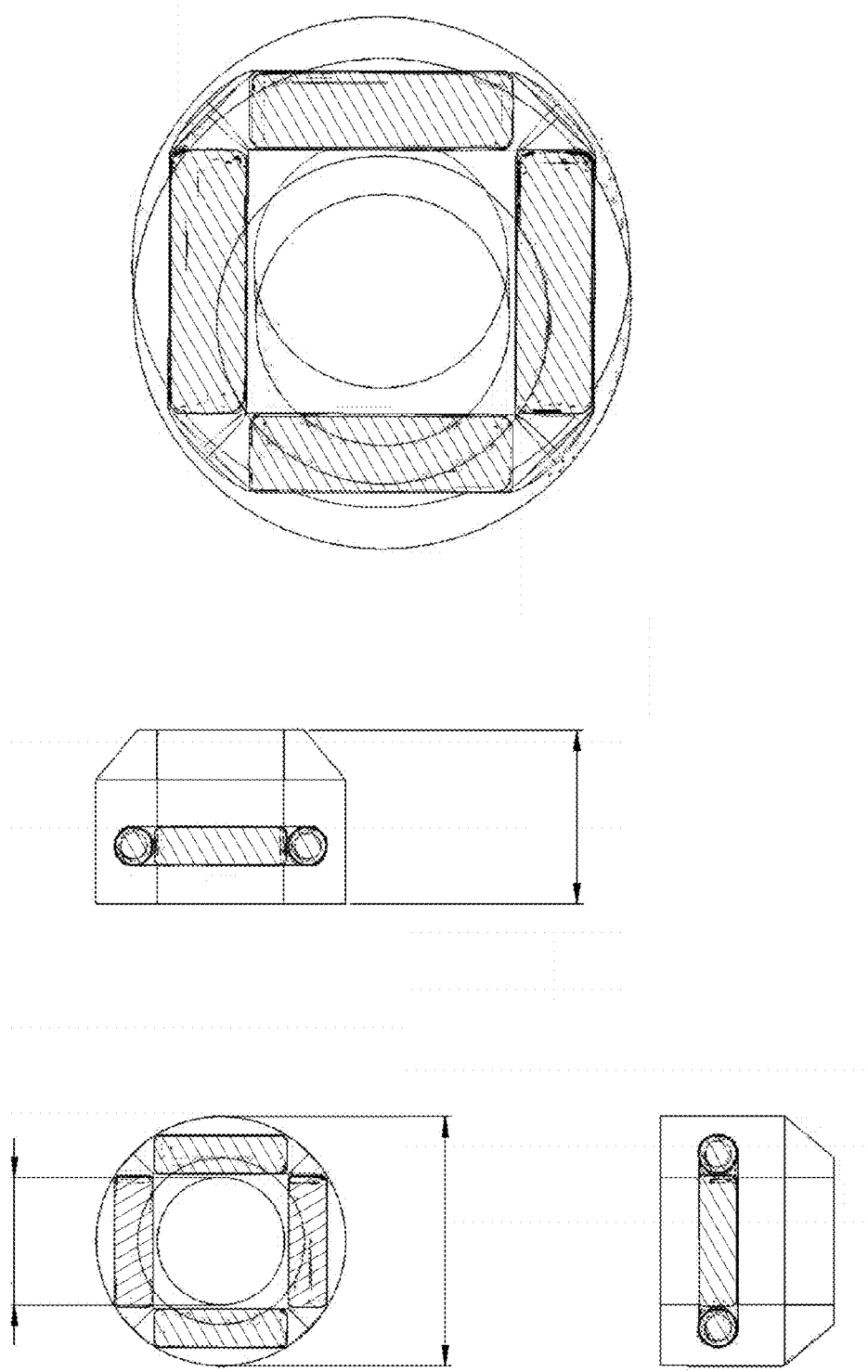
Figure 47:
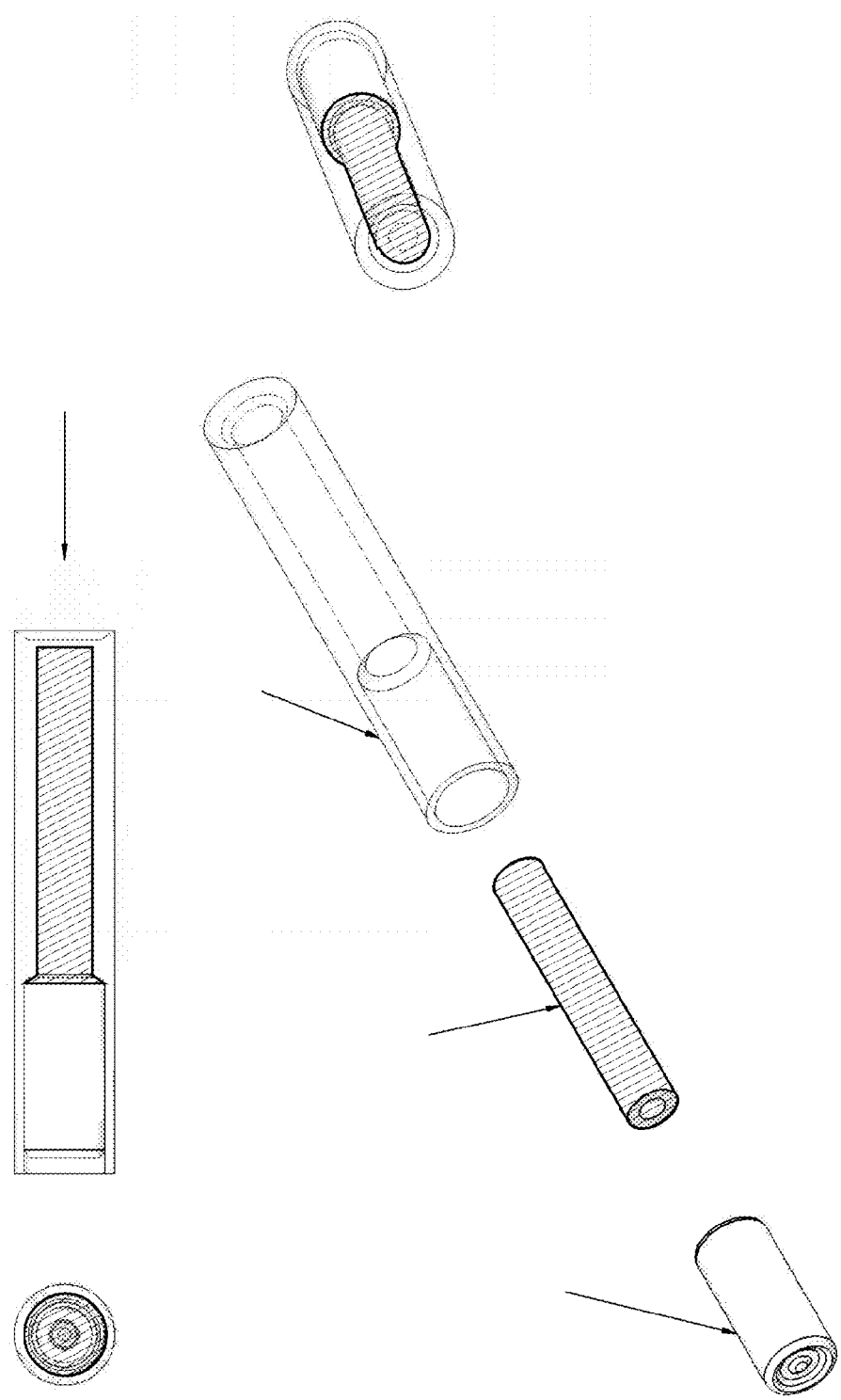
FIG. 47 (sheet 16/17) depicts an exploded view of a green tube and its functional elements as shown in FIG. 1, for example, and the view down is sighting axis of the tube.

Be it noted by way of introduction that in the variously described embodiments, identical parts are labeled with identical reference characters or identical component designations, such that the disclosures contained in the entire description can be transferred mutatis mutandis to identical parts having identical reference characters or identical component designations. The positional indications selected in the description, e.g. "upper," "lower," "lateral," etc., are also referred to the Figure being directly described and depicted, and upon a change in position are to be transferred mutatis mutandis to the new position. In addition, individual features or feature combinations from the various exemplifying embodiments shown and described can also represent solutions that are of themselves independent, inventive, or in accordance with the present invention.

According to FIG. 1, an embodiment of a sighting apparatus 1 according to the present invention comprises at least one self-luminous light source 2 that is arranged in portions of or, as depicted here, in its entirety in a tube 3. The periphery of tube 3 is manufactured from a light-guiding and/or light-collecting material, for example a transparent plastic or polymer composition. "Light-collecting" and "light-guiding" mean that light which penetrates through the lateral surface into the tube is collected and guided to the end surfaces, which in this case have the shape of circular rings. A material of this kind can be, for example, polymethyl methacrylate (PMMA), which is known by the trade name Plexiglas and into which can be embedded molecules which scatter the light that strikes them, or which fluoresce by the action of ambient light. A large portion of the emitted light is guided by total reflection to the end surfaces, where it emerges in concentrated fashion.

Light source 2 is preferably a self-luminous, active light source. It can be, for example, a glass vial, sealed in air-tight fashion, that is coated on the inner side with a phosphor and is filled with gaseous tritium. The electrons emitted from the tritium gas continuously activate the phosphor. Such light sources are obtainable, for example, in various colors under the name "Trigalight™" from MB-Microtec AG in Niederwangen, Switzerland CH-3172. The invention is not limited in principle to one specific spectral region. Depending on the requirement, light sources that emit light in the spectral region from infrared to ultraviolet can thus be used. Light sources that emit, for example, green, orange, or infrared can thus be used. The use of infrared light sources can be advantageous, for example, in conjunction with the utilization of night vision devices. Although the light sources depicted in the exemplifying embodiment shown here are in the shape of elongated vials, differently shaped light sources, for example wafer-shaped light sources, can therefore also be used to implement the invention. The use of wafer-shaped light sources can be advantageous in particular in conjunction with the annular embodiments of the invention that are described below. Other shapes can also be selected and multiple light sources can also be used in a single device.

Light source 2 can be secured in tube 3 by, for example, adhesive bonding.

As is further evident from FIG. 1, tube 3 can comprise, at least in portions, a casing 4 made of a material that is opaque in the visible light region. Be it noted at this juncture, however, that tube 3 can also be uncovered. This means that the surface of the entire tube 3 can also not be covered, as depicted in the left portion of FIG. 1.

For reasons of robustness and simplicity of manufacture, casing 4 can be embodied in the form of a sleeve, by preference a metal sleeve, slid onto tube 3. It would also be conceivable, however, also to use a plastic sleeve instead of a metal sleeve.

Tube 3 can be closed off, at a portion facing toward a user, with a transparent material 5, for example sapphire, in order to protect that side of light source 2 which faces toward a user. Transparent material 4 can be, for example, adhesively bonded to casing 4.

In accordance with the embodiment in FIG. 1, the light source can be arranged at the front end (in a sighting-in direction) of tube 3.

FIG. 2 is a plan view of an end face of tube 3 in the viewing direction or sighting direction of a user or operator. As is readily apparent, light source 2 appears as an illuminated colored dot that is surrounded by two concentric annular surfaces. The annular surfaces are constituted by the end face of tube 3 and of casing 4. Tube 3 can be constituted from a material that has a color different from that of the light emitted from light source 2. This serves chiefly to create a color contrast between light source 2 and the end surface of tube 3. Fluorescent molecules that can be excited by the light of light source 2, or by ambient light, can also be embedded in the material of tube 3.

The variant of the invention depicted in FIG. 3 differs from the embodiment depicted in FIG. 1 principally in terms of the arrangement of light source 2. In the arrangement shown here, light source 2 is arranged at an end of tube 3 facing away from a user. With this variant of the invention as well, tube 3 is closed off at the user end with a transparent material 5. The user-side end likewise comprises a casing 4.

As is evident from FIG. 4, the image visible to a user in the sighting-in direction is identical to the one achievable from FIG. 1. A difference between the embodiments of FIG. 1 and of FIG. 3 may be seen, however, in the fact that with the variant depicted in FIG. 3, light source 2 is completely visible only when the observer's viewing direction is in line with the longitudinal center line of tube 3, so that with this embodiment a parallax deviation can be corrected.

According to FIG. 5, at least one light-refracting element 6, preferably a converging lens, can be arranged in tube 3. When a converging lens is used, its focal length can be designed so that a maximum brightness is located approximately in an observer's eye. For this purpose, the focal length of the converging lens can be selected so that the focal point or focal plane is located approximately on a user's retina. Because the spacing between the eye and light source 2 is usually predetermined by the apparatus used, for example a weapon or a distance measuring device, exact coordination of the lenses does not represent a problem.

It should be mentioned at this juncture that instead of a converging lens, it is possible for a lens system or prisms to be arranged in tube 3 after light source 2, depending on the desired distribution of the intensity distribution emerging at the user end from tube 3, or depending on the desired beam profile of the emerging light.

As shown in FIG. 6, light-refracting element 6 can be used instead of transparent material 5. Be it noted that light-refracting element 6 is of course also constituted from a transparent material.

In the variant shown in FIG. 6 as well, it is a matter of course to use a converging lens in order to focus the light and thus increase the intensity of the light entering the observer's eye.

With reference to the embodiments shown in FIGS. 5 and 6, be it noted further that these can favorably be combined with one another, so that light-refracting elements 6 can be arranged both in the interior and at the exit of tube 3.

According to FIG. 7, apparatus 7 according to the present invention can be embodied as a ring 8. As is further evident from FIG. 7, the light sources can be embedded in a periphery of ring 8. Multiple rod-shaped light sources 2 can be arranged, in this context, around a center axis of ring 8. Light sources 2 can be arranged in particular in the shape of a polygon, in particular a rectangle, around the center axis, such that the longitudinal extent of each of light sources 2 can be arranged transversely with respect to a sighting direction. Light sources 2 also radiate light radially with respect to their longitudinal extent, so that an observer sees an illuminated rectangle that is arranged around a see-through opening 9. More or fewer light sources 2 can of course also be arranged around see-through opening 9.

Instead of the rod-shaped light sources 2 shown here, planar light sources can also be used with this variant of the invention.

According to FIG. 8, the variant of the invention depicted in FIG. 7 can also comprise an annular element 10 having conical outer walls in order to incouple ambient light and to reflect light that is emitted from the light sources. A transparent material, for example a pigmented plastic, can be used as a material for ring 8 or element 10, respectively.

As is evident from FIG. 9, light sources 2 can be rod-shaped and arranged parallel to an axis of ring 8, or can be of planar configuration.

According to FIG. 10, a sighting apparatus 11 according to the present invention can comprise a rear sight 12 and a front sight 13.

According to a variant of the invention, rear sight 12 can be embodied as a peep sight and can be implemented by means of an annular sighting apparatus 7 as depicted in FIGS. 7 to 9. A standard front sight, or also a tubular sighting apparatus 1 as depicted in FIGS. 1 to 6, can be used as front sight 13. Be it noted at this juncture that when a front sight 13 as depicted in FIGS. 1 to 6 is used, a conventional front sight can also be used. Alternative embodiments to the variant embodiments of rear sight 12 and front sight 13 recited in this paragraph will be recited below.

As is evident from FIG. 11, rear sight 12 can be embodied as a U- or V-notch sight, such that at least one respective light source 2 can be arranged on either side of a U- or V-shaped depression 14 of rear sight 12. The longitudinal extents of light sources 2 of rear sight 12 extend in this context transversely to a sighting direction.

The rear sight can comprise, on both sides of the U- or V-shaped depression 14, a respective element 15 made of a light-guiding or light-collecting material that comprises a light incoupling region 16 for collecting ambient light.

As depicted in FIG. 12, light-guiding element 15 can have, for example, a T-shaped cross section, such that light source 2 can be arranged in a crosspiece 17 of the T. Light source 2 can thus, for example, be inserted into an orifice of light-guiding element 15. Light source 2 can be, for example, adhesively bonded in the orifice. Adhesive bonding can also be omitted if the orifice is closed off, for example by filling with a hardening material. Thus, the orifice does not need to extend from an opening on one side of the light guiding element all the way through to the other side.

Alternatively to the use of a T-shaped element, light-guiding element 15 can also be embodied in cylindrical fashion, in particular with a rectangular base surface. It may be mentioned at this juncture that light-guiding element 15 can also have any other suitable base shape, for example trapezoidal or triangular or polygonal. A "base shape" is understood here as a base shape or surface of element 15 or a normal projection of element 15 into a plane.

Rear sight 12 can furthermore comprise, on both sides of its U- or V-shaped depression 14 serving for sighting, at least one respective mount 18 into which an end-face end region, containing at least one light source 2, of element 15 made of light-guiding material is insertable. In FIG. 13, which depicts a frontal view of element 15, this end-face end region is labeled with the reference character 19.

Further variants of front sight 13 that can be used according to the present invention with a rear sight such as the one depicted in FIGS. 11 to 13 or 7 to 9 are explained with reference to FIGS. 14 to 21.

FIG. 14 depicts an exemplifying embodiment of a variant of front sight 13 in a longitudinal section. The reference number 20 designates an elongated housing that receives in its interior further components described below. The housing is preferably of circular cylindrical conformation and is made of a material as transparent as glass, for example sapphire.

The number 21 designates the longitudinal axis of the front sight, and arrow 22 designates the sighting-in direction, i.e. the direction in which a user looks into sighting device 11. Proceeding from the left (in FIG. 14) end surface of housing 20, the latter comprises a first cylindrical opening 23 that extends approximately as far as the longitudinal center of the housing. The base of first opening 23 transitions at a conical angle into a second, smaller cylindrical opening 24. The conical angle results in formation of a first oblique surface 25 that has the shape of an inner surface of a frustoconical periphery. The base of second opening 24 is located close to the right (in FIG. 14) end face of housing 20, and is constituted by a flat circular first bottom surface 26 arranged at right angles to longitudinal axis 21. Arranged in the right (in FIG. 14) end face of housing 20 is a depression 27 that is constituted by a second oblique surface 28 and a second bottom surface 29. Second oblique surface 28 has the shape of an inner surface of a frustoconical periphery, and second bottom surface is flat, circular, and oriented at right angles to longitudinal axis 21. First oblique surface 25 and second oblique surface 28 can, but need not, exhibit the same conical angle.

Light source 2 is received in first opening 23.

Tube 3, which is made of a transparent, preferably colored material, is inserted in second opening 24. In the exemplifying embodiment described here, the material of tube 3 is colored red or green, and other colors can be used.

FIG. 15 is a view of front sight 13 in sighting-in direction 22 in a context of dim ambient light or complete darkness. The light emitted from light source 2 on the one hand travels through the cavity of tube 3 and appears in this view as a, for example, green circular dot 30 having a diameter that corresponds to the inside diameter of tube 3. Dot 30 is surrounded by an annular surface that corresponds to end surface 31 of tube 3. This annular surface 31 is equipped in this example with a screen pattern and therefore appears gray. This is intended to illustrate the fact that when there is little or no ambient light, this annular surface radiates practically no light and therefore appears dark. To prevent annular surface 31 from radiating light that is guided from light source 2 axially through the wall of tube 3, that end surface of tube 3 which faces toward light source 2 can be covered. Annular surface 31 is surrounded in FIG. 15 by a further annular surface that corresponds to second oblique surface 28. This further annular surface 28 radiates light that penetrates from light source 2 through first oblique surface 25 into the material of housing 20, is conveyed therein by total reflection, and emerges at second oblique surface 28. When the user of the sighting device sees annular surface 28 and dot 30 exactly concentrically as in FIG. 15, his or her eye is looking into the sighting device exactly in the direction of longitudinal axis 21.

FIG. 16 is a view of front sight 13 in sighting-in direction 22 in a context of relatively bright ambient light, for example in daylight. The light emitted from light source 2 travels through the cavity of tube 3 and, in this view as well, appears for example as a circular green dot 30 having a diameter that corresponds to the inside diameter of tube 3. As in the example according to FIG. 15, dot 30 is surrounded by an annular surface that corresponds to the end surface of tube 3. This annular surface 31 appears in this example as, for example, a luminous red, because the light-collecting plastic of tube 3 collects the ambient light penetrating through the lateral surfaces of housing 20 and of tube 3 and delivers it in concentrated fashion at end surface 31. This effect can be even further intensified if that end surface of tube 3 which faces toward light source 2 is equipped with a mirror coating that sends the light which strikes it back into the wall of the tube. The further annular surface, which corresponds to second oblique surface 28 and surrounds annular surface 31, is in this example provided with a screen pattern and therefore appears gray. This is intended to illustrate the fact that this annular surface appears, for example in daylight, to be darker than the luminous red annular surface 31, although light deriving from the green light source of course also emerges from it, as was described above in conjunction with FIG. 15. When the user of the sighting device sees annular surface 31 and dot 30 exactly concentrically as in FIG. 16, his or her eye is looking into sighting device 11 exactly in the direction of longitudinal axis 22.

A particular advantage of sighting device 11 according to the present invention is that it is usable seamlessly in all lighting conditions. Dot 30 is readily visible in all lighting conditions, since it corresponds to a direct view of light source 2 and differs in terms of color from annular surface 31 that directly surrounds it. In good lighting conditions, annular surface 31 is readily visible as a result of the light radiated from it, and it shines more brightly, the stronger the ambient light. In poor lighting conditions, in particular when the ambient light is dimmer than the light emitted from light source 2, outer annular surface 28 is clearly visible. Even if it has the same color as dot 30, it is nevertheless clearly delimited from dot 30 by the interposed, differently colored annular surface 31.

Possible dimensions of front sight 13 are, for example, as follows. Housing 20 can have a diameter of 5 mm and a length of 25 mm. Light source 2 can have a diameter of 4 mm and a length of 13 mm. Tube 3 can have an outside diameter of 2.5 mm and an inside diameter of 1.5 mm. These dimensions are intended to be entirely by way of example, and are not intended to limit the scope of protection of the claims in any way.

In a departure from the exemplifying embodiment described above and depicted in the Figures of the drawings, housing 20 can, for example, be made of the indicated transparent material only in the region that surrounds tube 3. That region of the housing which surrounds light source 2 can be made of a different material or, in extreme cases, can even be absent. Second oblique surface 28 can in principle be dispensed with; the end-face region of housing 20 between the outside diameter of the housing and the outside diameter of tube 3 would nevertheless, in the plan view according to FIG. 15, appear as an annular surface. This annular surface is, however, more sharply delimited by oblique surface 28. Second opening 24 need not be embodied, as depicted, as a blind orifice, but can also be a through orifice; the end surface of tube 3 can be set back with respect to the end surface of the housing, can be flush with it, or can protrude beyond it. The configuration shown does, however, especially facilitate complete sealing of the housing, and therefore protection from penetrating substances such as dirt and moisture.

The geometrical shapes described above are particularly well suited for aligning longitudinal axis 22 of sighting device 11 with the viewing direction of a user. Housing 20, light source 2, and tube 12 do not, however, obligatorily need to be circular; other cross-sectional shapes are instead also conceivable for achieving the purpose of the sighting device.

FIG. 17 shows a particularly simple embodiment of the apparatus according to the present invention. An element 32 made of a light-guiding and/or light-collecting material is arranged in a housing 20 that is embodied here as a glass vial. In this example as well, reference number 22 designates the sighting-in direction. Element 32 has, on the right (in FIG. 17) end face, an orifice 33 in which a light source 2 is received. At the opposite end (on the left in the Figure), the housing is closed off in sealed fashion with a closure 34, for example by filling with silicone. In contrast to the exemplifying embodiment described earlier, in the example according to FIG. 17 no parallax effect—caused by an axial offset of the respective end surface of light source 2 oriented toward the user and of element 32—occurs if one is not looking into the sighting device exactly in the axial direction. This embodiment is therefore less suitable for applications in which high-precision sighting is important. On the other hand, it is simpler and more economical to manufacture.

FIG. 18 shows a variant of front sight 13 of sighting device 11 in which front sight 13 comprises a housing 35 made of a transparent material, for example plastic, the housing being embodied in the form of a blind orifice. Tube 3 is inserted into housing 35. Light source 2 is arranged at the closed end of housing 35 facing toward the user.

For an observer looking in the sighting direction at front sight 13, its end face appears as depicted in FIG. 19. Visible at the center is the luminous dot 30 generated by the light source, which dot is surrounded by two differently colored concentric circles. These circles are caused by light emerging at the end surfaces of the tube and the housing wall, respectively.

The variant depicted in FIG. 20 differs from the embodiment shown in FIG. 18 principally in terms of the arrangement of light source 2 in an end of housing 35 that is farther away from the observer when viewed in the sighting direction. As is evident from FIG. 21, the embodiment according to FIG. 20 also generates the same frontal view, from the observer's point of view, as the embodiment according to FIG. 18.

It should be mentioned at this juncture that an observer who looks through rear sight 12 at front sight 13 also perceives, in addition to the end faces of the front sight that are depicted in FIGS. 15, 16 and 19, 21, the illuminated outlines of the rear sight, which are centered in unsharp fashion around the front sight and target.

In conclusion, be it noted that the exemplifying embodiments merely show possible variant embodiments of the solution according to the present invention, the invention not being limited to the variant embodiments specifically depicted. Combinations of the individual variant embodiments with one another are, in particular, also possible, these potential variations being within the capability of the skilled artisan active in this technical sector based on the enabling disclosure of the present invention. Also encompassed within the scope of protection are all conceivable variant embodiments that implement the ideas for solutions on which the invention is based and are not explicitly described or depicted or are made possible by combinations of individual details of the variant embodiments that are depicted and described. The protection likewise extends to the individual components of the apparatus according to the present invention to the extent that, taken individually, they are essential to realization of the invention.

The invention claimed is:

1. A sighting device containing at least one self-luminous light source and at least one element made of a light-guiding and/or light-collecting material, the element being embodied as a tube or ring having a first end-region, a second end-region and an internal cavity, the light source being received and positioned in an end-region inside the internal cavity of the tube or ring, wherein the light that penetrates into the tube through a lateral surface is collected and guided to the end surfaces, and wherein the light-collecting material is made of polymethacrylate into which are embedded molecules that fluoresce under the action of ambient light.

2. The sighting device according to claim 1, wherein the exterior of the tube is uncovered.

3. The sighting device according to claim 1, wherein the tube comprises, at least in portions, a casing made of a material that is opaque in the visible light region.

4. The sighting device according to claim 3, wherein the casing is constituted from a tubular metal sleeve.

5. The sighting device according to claim 4, wherein a transparent material is inserted into an end region of the metal sleeve.

6. The sighting device according to claim 3, wherein the tube is closed off on a portion facing toward a user with a transparent material.

7. The sighting device according to claim 6, wherein the transparent material is shaped as a lens or a converging lens.

8. The sighting device according to claim 7, wherein the longitudinal extent of the light source is arranged transversely to a sighting direction.

9. The sighting device according to claim 8, wherein the light source is embedded in a periphery of the tube or ring.

10. The sighting device according to claim 9, wherein multiple rod-shaped light sources are arranged around a center axis of the tube or ring.

11. The sighting device according to claim 10, wherein the light sources are arranged in the shape of a polygon or a rectangle around the center axis of the ring or tube.

12. The sighting device according to claim 1, wherein at least one element made of a light-guiding and/or light collecting material is a lens or a converging lens and is arranged in the tube between the light source and a light exit side facing toward a user.

13. The sighting device according to claim 1, wherein the light source radiates light at least radially with respect to its longitudinal extent.

14. The sighting device according to claim 1, wherein the device comprises a rear sight and a front sight, the front sight comprising an elongated, self-luminous light source that is arranged coaxially with a tube made of a light-guiding or light-collecting material, and the rear sight comprising at least two self-luminous light sources, the front sight comprising a light source and a tube.

15. The sighting device according to claim 14, wherein a housing surrounding at least a part of the lateral surface of the tube of the front sight is present, which housing is made of a transparent material that is different from the material of the tube.

16. The sighting device according to claim 14, wherein the rear sight is a peep sight implemented as a ring, and wherein multiple rod-shaped self-luminous light sources are embedded in a periphery of the ring and arranged around a center axis of the ring.

17. The sighting device according to claim 14, wherein the rear sight is embodied as a U-notch sight or V-notch sight, at least one light source being respectively arranged on either side of a U- or V-shaped depression of the rear sight.

18. The sighting device according to claim 17, wherein the rear sight comprises, on both sides of the U- or V-shaped depression, a respective element made of a light-guiding or light-collecting material, which optionally comprises a light-incoupling region for collecting ambient light.

19. The sighting device according to claim 18, wherein at least one of the light-guiding elements has a T-shaped cross section, the light source being arranged in a crosspiece of the T.

20. The sighting device according to claim 19, wherein at least one of the light-guiding elements is of a cylindrical configuration or has rectangular base surface.

21. The sighting device according to claim 17, wherein the longitudinal extent of the light sources of the rear sight extend transversely to a sighting direction.

\* \* \* \* \*